INVENTOR.
WILLIAM J. FRANK JR
BY Hudson, Boughton,
Williams, David & Hoffmann
ATTORNEYS Aug. 10, 1965 W. J. FRANK, JR 3,200,377

CIRCUIT SELECTOR SYSTEM EMPLOYING PLURAL STEPPING SWITCHES

Filed March 22, 1961

2 Sheets-Sheet 2

INVENTOR.
WILLIAM J. FRANK JR.

BY Hudson, Boughton, Williams, David & Hoffman

ATTORNEYS 3,200,377

CIRCUIT SELECTOR SYSTEM EMPLOYING PLURAL STEPPING SWITCHES

William J. Frank, Jr., Chagrin Falls, Ohio, assignor to The Warner & Swasey Company, Cleveland, Ohio, a corporation of Ohio Filed Mar. 22, 1961, Ser. No. 97,517
15 Claims. (Cl. 340—168)

The present invention relates to selector mechanisms of the stepping type and particularly to a circuit selecting mechanism adapted for use with a memory system of the matrix type for storing a plurality of words or commands which are to be read out from the storage individually.

In one type of memory for storing individual words or commands, a plurality of rows of binary elements are provided with each row being adapted to store one word or command. Each row has an input connection thereto and when the particular word or command is to be read out from the storage, a read signal is applied to the input connection corresponding to the row in which the word is stored. Consequently, if one hundred words or commands are to be stored in a matrix, the matrix will have one hundred input connections for the rows storing the command or word, one input for each row in which a command is being stored, and when the command or word in a particular row is to be read, a read signal is applied to the read or input connection for that row.

If the memory is used to store commands for controlling the operation of a machine, successive rows of the memory store commands or words which correspond to successive operations which are to be performed by the machine. When one command is read out, the machine performs an operation as dictated by the command and when this command is completed, a completion signal is produced by the machine. This completion signal may be used to effect operation of the circuit selecting mechanism to select the next following command.

It is desirable, however, to be able to select, at the will of the operator, any particular command stored in the memory; consequently, it is also desirable that the operator be able to set the command selector to select a particular command to be read from the memory. Furthermore, if the memory is capable of storing a larger number of commands than is normally used, it is desirable that the command selector after reading out the last stored command and in response to the completion signal from the machine signifying the execution of the last command, automatically run to a home position, which would normally be the first command in the machine operation.

It is known to provide a stepping mechanism for selecting a circuit which steps from one position to the following position and conventional mechanisms have been provided which will automatically step themselves through the various positions until the selected position is reached. This, however, it a time-consuming operation when a large number of circuits are being controlled by the stepping mechanism. For example, if one hundred possible circuits are being controlled, the stepping mechanism has one hundred possible positions and if the stepping mechanism is in a position, arbitrarily chosen as the number 1 position, and is to be stepped to a position arbitrarily chosen as position 99, the relay must take 98 distinct steps. Since each step requires a finite period of time, it is apparent that such a mechanism would not be the most desirable for high-speed operations.

Accordingly, it is an important object of the present invention to provide a new and improved circuit selecting mechanism of the stepping type which is operable to advance the setting of the mechanism a single step in response to a control signal, or which is operable to quickly select a chosen circuit even though the mechanism has a large number of possible positions and even though the chosen position is a large number of steps away from the immediate position of the stepping mechanism.

It is also an object of the present invention to provide a new and improved circuit selecting mechanism comprised of a plurality of stepping devices each having X positions and which are interconnected to provide a number of selections $X^n$ where $n$ is the number of stepping devices and each device is operable to sequentially select any one of $X^n$ number of circuits and wherein the mechanism can be set to automatically and quickly select any one of the circuits which requires more than one device to be stepped without requiring the mechanism to step through each possible intermediate position between the actual position and the selected position and in which the circuit mechanism may also be set to step to the following position each time a step signal is applied thereto and preferably is arranged such that the mechanism will operate, in response to a predetermined signal, to position itself at a predetermined "home" position upon the application of the next step signal.

A further object of the present invention is to provide a new and improved circuit selecting mechanism in which a unique circuit is made for each possible unique combination of positions of a plurality of stepping relays and in which the mechanism may be operated to step to the next following position each time a signal is applied, or in which the mechanism may be operated in response to a signal to select a circuit different from the next in sequence and requiring the operation of more than one relay to make the selection without the mechanism being required to step through all of the successive positions in sequence intermediate the actual position of the mechanism and the selected position of the mechanism.

Further objects and advantages of the present invention will become apparent from the following detailed description thereof made with reference to the accompanying drawings, forming a part of the present specification, and in which.

Figure 1:
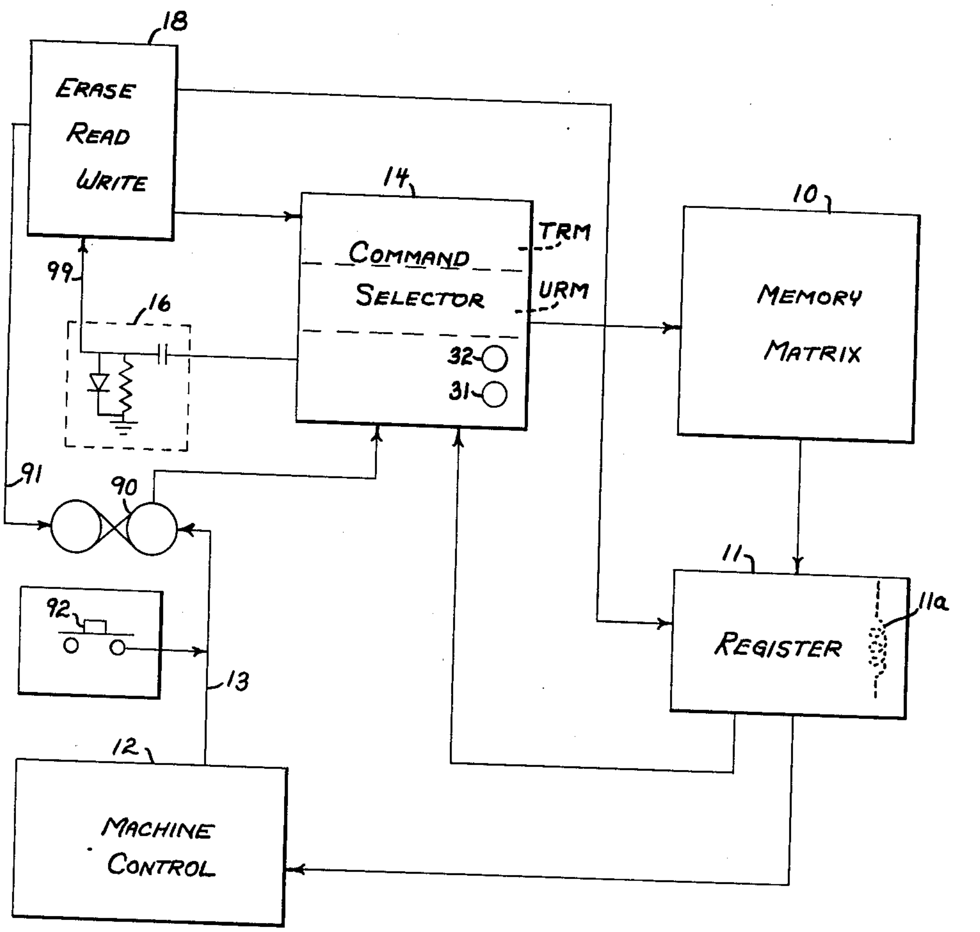
FIG. 1 is a schematic diagram, partly in block form, illustrating a command selector embodying the present invention in combination with a memory system for controlling a machine.

The present invention is susceptible of various constructions, modifications, and of use in various places where it is desirable to set stepping devices at one of the positions and is particularly useful as a circuit selector for a memory which stores commands that are to be read out successively or which are to be selected at random.

Referring to the drawings, a memory 10 is shown in block form and is adapted to store commands to be executed by a machine. Each command for the machine represents an operation which the machine is to carry out and a read-out register 11 is provided for reading out and storing a selected command. When the command is stored in the read-out register 11, a machine tool control system 12 operates to execute the command. When the command has been executed, the machine control system 12 provides a signal over a connection 13 indicating that the command has been completed and that the machine is ready for the next command. A command selector 14 is provided to select a command from the memory and is operable in response to a completion signal on the connection 13 to select the next command to be executed by the machine.

The command selector 14 can also be set to select any command stored in the memory 10. After the command selector has operated to select a command, the selector initiates a signal which is applied to a differentiating circuit 16 which, in turn, applies a pulse to a read signal generator 18 for generating a signal for reading the command selected and the command selector 14 routes this signal to the proper connection in the memory for reading the proper command. The read signal causes the command to be read and stored in the read-out register 11. The signal generator 18 may also provide a signal for erasing or resetting the register 11 preparatory to receiving the command being read.

Figure 2:
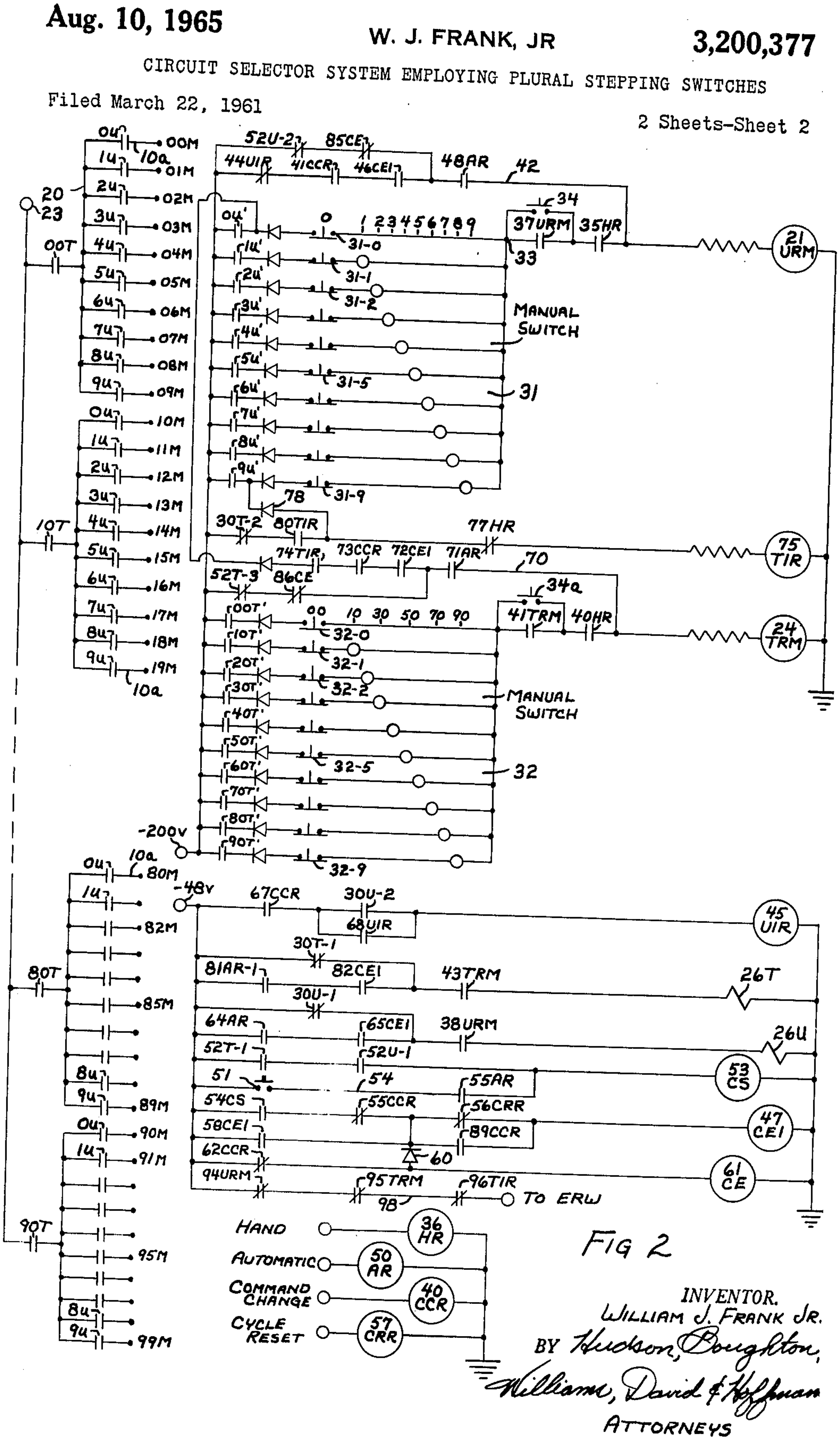
FIG. 2 is a circuit diagram in schematic form showing a circuit selecting mechanism embodying the present invention.

The memory 10 is preferably a matrix storage type of memory which has a plurality of rows comprised of binary elements and an input connection for each row. The command stored in the row is read by applying an input signal to the particular connection. The input connections for the memory 10 are not shown in FIG. 1 but are shown in FIG. 2, and as shown therein, the memory 10 has one hundred input connections numbered 00, 01 . . . 99. These input connections are identified by the reference character M preceded by the connection number. Thus the connections are identified as 00M, 01M, 02M . . . 99M. The input connections for the memory 10 are arranged in banks of ten, with the 00–09 connections being in one bank, the 10–19 connections being in the second bank, etc. Each input connection of each bank may be selectively connected to a common connection 20 for the bank by closing a respective contact of a unit stepping device or relay URM actuated by a units stepping relay coil 21URM. The conductor 20 of each of the banks of contacts can be selectively connected to a terminal 23 by closing a respective contact corresponding to each conductor 20. The contact for connecting the conductor 20 of the bank of input connections corresponding to positions 00–09 is designated as 00T, the contact for connecting the conductor 20 to the terminal 23 of the bank of input connections 10M . . . 19M is designated 10T, etc., and the contacts 00T, 10T . . . 90T are the stepping contacts of a tens stepping device or relay TRM including a tens actuating relay 24TRM and a solenoid 26T. The stepping relay TRM has a first position, designated as the "Home" position, wherein the contacts 00T are closed, a second position wherein the contacts 10T are closed, etc.

The units stepping device or relay URM has a first position wherein the contacts between the input connections 00M, 10M . . . 90M and the common conductor 20 of the particular bank are closed and these contacts are designated as contacts 0U. The units stepping relay or device has a second position wherein the contacts between the 01M connection, the 11M connection, etc., and the corresponding conductor 20 of each bank are closed and these contacts are designated as contacts 1U of the relay URM. Similarly, the units relay URM has contacts 2U connecting one unique input connection of each bank to the corresponding common conductor 20, contacts 3U, 4U, 5U, 6U, 7U, 8U and 9U in each bank connecting a respective input connection to the common conductor 20 of the bank. It can now be seen that the setting of the tens relay TRM determines the tens bank of input connections selected and the setting of the units relay URM determines the units connection of the tens bank which is selected and that the two relays having ten possible positions control the selection of one hundred circuits.

Figure 3:
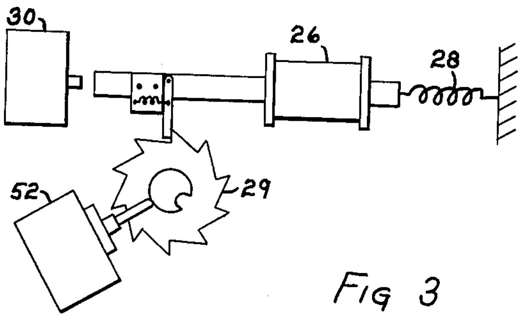
FIG. 3 is a diagrammatic showing of a ratchet-type stepping relay.

Each of the relays are of a type shown diagrammatically in FIG. 3. The relays each have a solenoid coil 26 which, when energized, operates a pawl to cock the pawl against the action of a spring 28. When the coil 26 is de-energized, the pawl engages a ratchet wheel 29 when it is returned by the spring to step the relay one step. The ratchet wheel has ten positions thereon corresponding to the ten possible positions of the relay and the units contacts of the relay are made in each position as described above. This type of relay requires the solenoid coil to be energized to cock the pawl and then de-energized to release the pawl to step the index wheel and, therefore, requires an energization and a de-energization of the solenoid to effect a stepping of the relay. Hereinafter, the solenoid 26 of the units relay URM and tens relay TRM will be referred to as solenoids 26U and 26T, respectively. The relays also have a switch which is actuted by the cocking of the pawl. This switch is indicated on the schematic diagram with the reference numeral 30. On the circuit diagram the switch contacts of the switch 30 of the units stepping device are indicated by the reference numeral 30U with a contact number appended thereto. The switch contacts of the switch 30 for the tens stepping device are designated by the reference character 30T with a control number appended. The switches 30 each have two contacts, 30U–1, 30U–2, and 30T–1, 30T–2.

In accordance with one feature of the present invention a selector switch 31 is provided and can be set to select a particular position of the units stepping relay URM, and a switch 32 is provided which can be set to select a particular position for the tens stepping relay TRM. The switches 31, 32 are ten-position switches and have ten sets of contacts, the sets being designated by the reference 31–0, 31–1 . . . 31–9 and 32–0, 32–1 . . . 32–9, respectively. The contacts of the switches 31, 32 are normally closed except when the switch is in a position corresponding to that particular set of contacts and at that time that set of the contacts is open. Each set of the contacts 31–0, 31–1, etc. is connected to one side of an energizing potential for the units relay actuating coil 21URM through a respective set of contacts of the units relay URM. These sets of contacts are designated 0U′, 1U′, 2U′, etc., and when the units relay URM is in its position where its contacts 0U are closed, the contacts 0U′ are closed, etc. Accordingly, the sets of contacts 0U′ . . . 9U′ are open except when the units relay URM is in a unique position corresponding to that set of contacts. The contacts 31–0 . . . 31–2 connect the respective contacts 0U′ . . . 9U′ to a junction 33 so that when one of the circuits is made by closing both the sets of contacts in that circuit, i.e. the contacts of the units stepping relay and the contacts of the units selector switch 31, a junction 33 is connected to the negative terminal of the power supply as indicated in FIG. 2. The junction 33 is, in turn, connected to one side of the units stepping relay coil 21URM through a pushbutton switch 34, having one contact conneced to the junction 33, and through the normally open contacts 35HR of a manual select relay 36HR. When the relay 36HR is energized to close its contacts 35HR, the junction 33 is connected to the units relay coil 21URM to energize the latter. Let it be assumed that the units switch 31 has been set in the "5" position so that the contacts 31–5 thereof in series with the units relay contacts 5U′ are open and let it further be assumed that the stepping relay URM is in its position where the contacts 0U′ are closed. Then, when the pushbutton 34 is depressed, a circuit will be made through the contacts 0U′ and the contacts 31–0 to energize the relay 21URM. This will close holding contact 37URM in parallel with the pushbutton switch 34 to form a holding circuit about the switch 34. The energization of relay coil 21URM also closes contacts 38URM in a circuit for energizing the units solenoid 26U indicated in the circuit diagram. The circuit for energizing the units solenoid 26U upon the closing of contacts 38URM is made through the normally closed contacts 30U–1 of the units interrupt switch 30, so that when the solenoid operates the pawl to a cocked position, the contacts 30U–1 are opened to break the circuit for energizing the solenoid 26U. The de-energization of the solenoid 26U effects the stepping of the ratchet wheel of the units stepping device one step to close the contacts 1U, 1U'. The closing of the contacts 1U' maintains the circuit through the selector switch 31 for energizing the units relay coil 21URM since it has been assumed that the selector switch is set in the "5" position. The contacts 0U'–9U' are overlapping contacts to assure that the circuit for energizing relay coil 21URM is not broken during the stepping from one position to the next. It will be appreciated that the relay will continue to operate in steps until the fifth position is reached, and when the "5" position is reached, the contacts 31–5 will be open and prevent the circuit for energizing units relay coil 21URM from being maintained. Consequently, the relay will be de-energized to open its contacts 38URM. When the contacts 38URM are opened, the closing of the contacts 30U–1 on the de-energization of solenoid 26U is ineffective to energize the solenoid and effect a subsequent stepping of the units relay.

The selector switch 32 operates in the same manner as the selector switch 31 to control the position of the relay coil 24TRM when the relay 36HR is energized and the pushbutton 34 is operated. The relay 36HR has contacts 40HR which connect the switch 32 to the relay coil and the circuit for energizing the relay coil 24TRM through the contacts 40HR include contacts 34*a* of the pushbutton switch 34, so that when the pushbutton switch 34 is operated, the contacts 34*a* are also closed. The contacts 34*a* are paralleled by contacts 41TRM which are holding contacts actuated by relay coil 24TRM and which operate in the same manner as contacts 37URM of the relay coil 21URM. The relay coil 24TRM also actuates normally open contacts 43TRM in a circuit for energizing the solenoid 26T of the tens relay and the contacts 43TRM are connected to the negative side of the power supply for energizing the solenoid 26T through interrupt contacts 30T–1 of the interrupt switch 30 of the tens relay. It is believed to be apparent that the switch 32, the contacts 00T', 10T' and contacts 20T', etc., function in the same manner as the corresponding contacts in switch 31 for energizing the relay coil 21URM; therefore, the description thereof will not be repeated. It will be noted, however, that when the pushbutton 34 is operated, the units relay and the tens relay will step concurrently to the selected position and, consequently, if the relays are both in their "0" position and the position selected is 11, when the pushbutton 34 is pushed, the relays will take one step simultaneously and not eleven steps in sequence as is normally required by stepping mechanisms.

In accordance with another feature of the present invention the circuit for controlling the stepping mechanism also includes a relay coil 40CCR which is energizable to effect a single stepping of the units stepping relay and also a single stepping of the tens relay when the units relay changes from its "9" position to its "0" position. To this end, the relay 40CCR has contacts 41CCR in a circuit 42 connected in parallel with the selector switch 31, the command push button 34, and the contacts 35HR for energizing the coil 21URM of the units stepping device. The parallel circuit 42 includes normally closed contacts 44UIR actuated by a relay coil 45UIR, and the normally opened contacts 46CEI actuated by a relay coil 47CEI, and the normally opened contacts 48AR actuated by an automatic selector relay coil 50AR which is energized whenever the relay coil 40CCR is to be effective to step the mechanism a single step.

Each of the units and tens stepping devices has a switch which is operated when the stepping device is in a home position. It is assumed that the home position for the units stepping device and the tens stepping device is the "01" position and the "00" position, respectively, and when one of the devices is in this position a home switch 52 is actuated. The switch 52 is shown in FIG. 3 and the home switch 52 for the units stepping device shall be designated by the reference numeral 52U, while the switch 52 of the tens stepping device will be referred to as the switch 52T. The switches 52U and 52T have contacts 52U–1 and 52T–1, respectively, which are connected in series to energize a relay 53CS when both switches are actuated at the home position to close the contacts 52T–1, 52U–1. When the units and tens stepping devices are not in their home position, the switches 52T, 52U will be actuated to a position where the contacts 52T–1 and the contacts 52U–1 are open to de-energize relay 53CS. The contacts 52T–1 and 52U–1 are paralleled by a pushbutton switch 51 and the normally open contacts 55AR of the automatic relay 50AR so that relay 53CS can be energized by the operator when the relays are not in "Home" position. It can now be seen that whenever the relay coil 50AR is energized, the relay coil 53CS can be energized if it is not energized by the contacts 52T–1, 52U–1, and that the relay is normally de-energized when either stepping devices is not in home position.

The energization of the relay coil 53CS closes its contacts 54CS in a circuit for energizing the relay coil 47CEI. The circuit completed through the contacts 54CS for energizing the relay coil 47CEI includes the normally closed contacts 55CCR actuated by the relay coil 40CCR and the normally closed contacts 56CRR actuated by a relay coil 57CRR. When the relay coil 47CEI is energized, it closes normally open contacts 58CEI in parallel with the contacts 54CS and 55CCR in the circuit for energizing the relay 47CEI. The contacts 54CS are also connected through a diode 60 to energize a relay coil 61CE when relay coil 53CS is energized. When the contacts 58CEI are made, the de-energization of relay coil 53CS does not affect the energization of relay coil 47CEI and relay coil 61CE.

From the foregoing, it can be seen that, when the relay coil 50AR is energized, the relay coil 53CS can be energized regardless of the position of the stepping relays and this in turn will effect energization of the relay 47CEI and will make a circuit for energizing the relay coil 61CE. It will be noted that the relay 61CE also has an energizing circuit including the normally closed contacts 62CCR of actuating relay coil 40CCR. It will be recalled that the relay coil 40CCR is the relay coil which is to be energized each time that the stepping mechanism is to be stepped a single step and that the contacts 62CCR thereof would normally be closed to energize the relay coil 61CE. The contacts 58CEI, however, maintain the relay coil 61CE energized upon the energization of actuating relay coil 40CCR as long as the relay coil 47CEI is energized.

The energization of the relay coil 47CEI closes its contacts 46CEI in the circuit 42 for energizing the relay coil 21URM and since the contacts 48AR in the same circuit were closed on the energization of the automatic relay 50AR, the relay coil 21URM is energized when the relay coil 40CCR is energized, through the circuit 42. The energization of the relay coil 21URM closes its contacts 38URM in the circuit for energizing the units stepping solenoid 26U and effects energization thereof. It will be recalled that when the units stepping solenoid was energized under manual operation, the contacts 30U–1 were broken upon the operation of the solenoid 26U to break the circuit for energizing the solenoid and to thereby effect a stepping of the units stepping device. In automatic operation, however, the contacts 30U–1 are rendered ineffective by a shorting circuit connected thereacross and including the normally open contacts 64AR operated by the automatic relay coil 50AR and the normally open contacts 65CEI operated by the relay coil 47CEI, both of these relays being energized upon energization of relay coil 50AR to close the contacts for shorting the contacts 30U–1. Accordingly, the units stepping solenoid 26U is maintained energized upon the closing of the contacts 38URM. The energization of the relay coil 40CCR, to effect the energization of relay coil 21URM and the energization of the units stepping solenoid 26U, also effects the closing of its contacts 67CCR in a circuit for energizing the relay coil 45UIR. The contacts 67CCR are connected to energize the relay coil 45UIR through contacts 30U-2 of the units interrupt switch 30U. The contacts 30U-2 are normally open contacts and are closed upon the energization of the units solenoid 26U and the retraction of the units pawl. Accordingly, when the units solenoid is energized upon the closing or energization of the relay 40CCR as above described, the relay coil 45UIR is energized to open its contacts 44UIR in the circuit 42 through which the relay coil 21URM is being energized. The opening of these contacts de-energizes the relay coil 21URM to open its contacts 38URM in the circuit for energizing the units stepping solenoid 26U to de-energize the solenoid and thereby effect a stepping of the units stepping device. Normally the de-energization of the units stepping solenoid would effect the opening of the contacts 30U-2 in the circuit for energizing relay 45UIR and this would, if the relay coil 40CCR were still energized, effect the re-energization of relay coil 21URM to start another stepping cycle. To prevent this, since the stepping device is to be stepped a single step in response to the energization of relay coil 40CCR, the relay coil 45UIR operates holding contacts 68UIR connected across the contacts 30U-2 so that the relay 45UIR remains energized until the contacts 67CCR in the circuit for energizing the relay 45UIR are opened by the de-energization of relay 40CCR, which de-energization also opens contacts 41CCR in the circuit which had been effective to energize the relay coil 21URM. Consequently, the de-energization of relay coil 45UIR and the closing of its contacts 44UIR cannot effect a re-energization of the relay coil 21URM.

When the units stepping device or relay is to be stepped one position for each energization of the relay coil 40CCR, the tens stepping device or relay must be stepped one position each time the unit stepping device is stepped from its "9" position to its "0" position. Therefore, circuitry is provided for effecting a single stepping of the tens stepping device or relay each time the units stepping device or relay is stepped from the "9" position to the "0" position. This circuit means includes a circuit 70 for energizing the relay coil 24TRM of the tens stepping device. The circuit 70 is connected in parallel with the selector switch 32, the pushbutton switch contacts 34*a* and the manual relay contacts 40HR, and proceeding from the relay coil 24TRM to the negative side of the power supply, the circuit 70 includes normally open contacts 71AR actuated by the automatic relay coil 50AR, normally open contacts 72CEI actuated by the relay coil 47CEI, normally open contacts 73CCR actuated by the relay coil 40CCR, normally open contacts 74TIR actuated by a relay coil 75TIR and the contacts 0U' of the units stepping device URM. The relay coil 75TIR is energized when the units stepping device is in its "nine" position to close its contacts 74TIR and to effect the energization of relay coil 24TRM when the units stepping device steps from its "nine" position to its "zero" position and closes the normally open contacts 0U' of the units stepping device URM. It will be recalled that, when the circuit is conditioned for automatic operation to effect a single stepping of the devices upon the energization of the relay coil 40CCR, the relay coil 50AR is energized, as well as the relay coils 47CEI and 40CCR, the latter being energized when the stepping is to be effected. It will also be recalled that the contacts 0U' of the units stepping device URM are open except when the units stepping device is in its "0" position. It will be apparent, therefore, that when the circuit is conditioned for automatic operation and when the relay coil 40CCR is energized, the circuit 70 will be effective to energize the relay coil 24TRM provided the units stepping device is in its zero position and the relay coil 75TIR is energized to close its contacts 74TIR.

The relay coil 75TIR is energized when the units stepping device URM is in its "9" position. The relay coil 75TIR has one side connected to the positive side of the power supply and the other side connected to the negative side of the power supply through normally closed contacts 77HR actuated by the manual relay 36HR, which is de-energized in automatic operation, a diode 78, and the normally open contacts 9U' of the units stepping device. When the units stepping device is in its "9" position, the relay 75TIR will be energized through the described circuitry to close its contacts 74TIR in the circuit 70 for energizing the relay coil 24TRM. The circuit 70 will not, however, energize the relay 24TRM because the circuit 70 includes the now open contacts 0U'. The energization of 75TIR, however, closes its contacts 80TIR to form a holding circuit across the contacts 9U', the holding circuit including the normally closed contacts 30T-2 of the tens interrupt switch. Consequently, when the units stepping device is stepped from its "9" position to its "0" position where the contacts 9U' are open and the contacts 0U' closed, the energization of relay 75TIR will be maintained, and since the circuit 70 is now connected to the negative side of the power supply through the contacts 0U' and the contacts 74TIR are closed, the relay coil 24TRM is energized to close its contacts 43TRM for energizing the tens stepping solenoid 26T. The energization of the tens stepping solenoid and the subsequent opening of the contacts 30T-1 is not effective to cause a de-energization of the tens stepping solenoid, since the now energized relays 50AR, 47CEI have normally open contacts 81AR-1 and 82CEI which are now closed to form a shorting circuit around the contacts 30T-1 to maintain the tens stepping solenoid energized as long as the contacts 43TRM are closed. However, the circuit 70 for energizing relay coil 42TRM includes the contacts 30T-2 of the tens interrupt switch 30T and when these are opened on the operation of solenoid 26T the holding circuit for the relay 75TIR is broken. This opens up the contacts 74TIR in the circuit 70 to de-energize relay coil 24TRM which, in turn, opens its contacts 43TRM to de-energize the solenoid for stepping the tens stepping device or relay. The de-energization of the stepping solenoid causes the tens stepping device to step one step to the next position.

There are times when, for one reason or another, it is desirable to cause the selector system to return to its home position, i.e. the position where the units stepping device is in its 01 position and the tens stepping device is in its 00 position. Normally stepping systems, such as the disclosed stepping system, are returned home by stepping the system through each possible position in sequence. This, however, is time-consuming and is unsatisfactory in many applications. Accordingly, the present invention includes as one of its features means for causing the units device and the tens stepping device to return home independently of each other in response to certain conditions. The units stepping device and the tens stepping device, when returning home, operate concurrently with each other until they reach the home position and it is not necessary to operate the stepping system through each possible position of the system to return it home.

When the stepping system is to be returned to its home position, the relay coil 57CRR is energized to open contacts 56CRR in the circuit for energizing relay coil 47CEI. When the contacts 56CRR are opened, the relay 47CEI is de-energized to open its contacts in the circuits 42 and 70, for energizing the relay coils 21URM, 24TRM, respectively, to render these circuits ineffective to energize the coils.

The de-energization of relay coil 47CEI also opens its contacts 58CEI in the holding circuit for the relay 47CEI and for the relay 61CE. These contacts, however, do not effect the de-energization of the relay 61CE, since as long as the relay 40CCR is de-energized, a holding circuit for the relay coil 61CE is completed through the contacts 55CCR actuated by the relay coil 40CCR and the contacts 54CS actuated by the relay coil 53CS which is energized during automatic operation in all positions of the stepping devices. When, however, the relay coil 40CCR is energized, the contacts 55CCR in the holding circuit for relay coil 61CE and the contacts 62CCR actuated by the relay coil 40CCR and in the circuit for energizing relay coil 61CE are opened to break the circuit for energizing relay coil 61CE to de-energize the relay coil and close its normally closed contacts. The relay coil 61CE operates normally closed contacts 85CE connected in series with contacts 52U–2 of the home switch 52 for the units stepping relay. The contacts 52U–2 are closed except when the stepping device U is in its home, i.e. "01" position. The contacts 52U–2 and 85CE are in parallel with the contacts 44UIR, 41CCR and 46CEI of the circuit 42 and in series with the automatic relay contacts 48AR and effect energization of the relay coil 21URM when the contacts 52U–2 and 85CE are closed and relay coil 50AR energized. Consequently, when the relay coil 61CE is de-energized and the relay coil 50AR energized, the relay coil 21URM will be energized through the described circuit if the units stepping device is not in its home position and will be maintained energized until the contacts 52U–2 are opened by the returning home of the units stepping device. As long as the relay 21URM is energized, its contacts 38URM are closed to effect an energization of the units stepping solenoid through the contacts 30U–1 of the units interrupt switch 30. It will be noted that the circuit shorting the units interrupt switch contacts 30U–1 is ineffective since the relay coil 47CEI is now de-energized opening the contacts 65CEI. It will be recalled that the units interrupt contacts 30U–1 are actuated each time the solenoid for stepping the units switch is energized and the pawl retracted to cause a de-energization of the solenoid and the release of the pawl. Consequently, the units stepping solenoid 26U will be repeatedly energized and de-energized as long as the contacts 38URM remain closed. This will step the units stepping device through its positions until it reaches home and the contacts 52U–2 are opened to de-energize the relay coil 21URM and open the contacts 38URM.

While the units stepping device is being stepped to its home position in response to the de-energization of the relay coil 61CE, the same operation is occurring in the tens stepping device. The relay coil 61CE operates contacts 86CE connected in series with normally closed contacts 52T–3 actuated by the tens "home" switch 52 with the contacts 52T–3 and 86CE being connected in series with the automatic contacts 71AR and the relay coil 24TRM across the power supply. The contacts 52T–3 are open in the home position and closed in all other positions of the tens stepping device and when the relay 66CE is de-energized, the relay coil 24TRM will be maintained energized until the tens stepping device returns home. When the relay coil 24TRM is energized, it closes its contacts 43TRM in the circuit for energizing the tens stepping solenoid and the solenoid is energized through the contacts 30T–1 of the tens interrupt switch until the solenoid actuates the pawl, at which time the contacts are opened to effect a de-energization of the solenoid. But when the solenoid is de-energized, the pawl is released and the tens interrupt contacts 30T–1 and are again closed to effect another energization of the solenoid, etc. The tens stepping solenoid will be repeatedly energized and de-energized until the tens stepping device is returned home and the contacts 52T–3 are opened to de-energize the relay coil 24TRM to open its contacts 43TRM in the circuit for energizing the tens stepping solenoid.

The relay coil 57CRR for effecting the return home may be controlled by a relay in the read-out register 11, if the command selector 14 is to store a number of commands less than the capacity of the stepping system, for example the register might store only eighty-five commands. After each command, the register is stepped to the next command and when the register is stepped to the eighty-fifth and final command, the command or word read out can include a bit which operates a relay 11A of the read-out register to energize the relay coil 57CRR. When the relay coil 57CRR is energized, it opens its contacts 56CRR to deenergize the relay 47CEI and to condition the control circuitry to effect a stepping of the units and tens stepping device to their home position when the relay coil 40CCR is next energized, as described above. When the relay 40CCR is next energized, the units relay or stepping device and the tens relay or stepping device will run home. If the relay 40 CCR has not been turned off when relay 11*a* is energized to pick up relay coil 57CRR, the stepping devices would run home without waiting for the execution of the command just read since the circuits through contacts 58CEI and 62CCR would be broken to de-energize 61CE. To prevent such an occurrence, the relay 40CCR has normally open contacts 89CCR in parallel with the contacts 56CRR so that if relay coil 57CRR is energized while relay coil 40CCR is energized, relay coil 47CEI will not be de-energized to open contacts 58CEI and start the run home by de-energizing relay coil 61CE since contacts 89CCR will maintain coil 47CEI energized until relay coil 40CCR is de-energized. When the latter happens, normally closed contacts 62CCR will keep relay coil 61CE energized until relay coil 40CCR is next energized to open them.

When the stepping system shown in the circuit diagram is embodied to control the operations of the machine, the relay 40CCR can be controlled by a flip-flop 90 which has two mutually exclusive, conductive states and which is triggered to one state by a completion signal appearing on the connection 13 from the machine control circuit and to its other state by a pulse signal appearing on a connection 91 to the flip-flop 90. When the flip-flop 90 is in the state, arbitrarily designated as its (1) state, to which it is triggered by the signal on the connection 13, the relay 40CCR is energized and when the flip-flop 90 is in its state arbitrarily designated as its (0) state, to which it is triggered by a signal on the connection 91, the relay 40CCR is de-energized. In addition to the signal from the machine control system, a signal for flipping the flip-flop 90 may be applied to the connection 13 from a manual control station including a pushbutton switch 92 which is depressable to provide the signal for changing the flip-flop to its (1) state. Consequently, the relay 40CCR can be turned on to initiate the operation of the stepping devices. After the stepping system has been stepped to the next command, it is desirable to automatically read the command and to turn off the relay 40CCR. To this end, the relay coils 21URM, 24TRM and 75TIR operate normally closed contacts 94URM, 95TRM and 96TIR, respectively, which are in a circuit 98, shown at the bottom of FIG. 2, for applying a signal to the differentiating circuit 16. When all of the relay coils 21URM, 75TIR and 24TRM are de-energized at the completion of a stepping operation, a circuit will be made to apply a negative potential to the differentiating circuit and the output of this circuit will be a negative going pulse which appears on an output connection 99 from the circuit 16. The output connection 99 is connected to the read signal generator 18 to apply the pulse to the generator to cause a read signal to the terminal 23 to effect a reading of the circuit now selected by the command selector. The signal generator may also apply an erase signal to the read-out register 11, or this signal could be derived in any other appropriate manner. For example, the signal from the differentiating circuit could be applied as an erase signal as well as a signal for initiating the read signal. The signal generator 18 also provides a signal on the connection 91 when the generator is pulsed by a signal on line 99 to provide a signal to flip the multivibrator circuit 90 to its (0) state where the relay 40CCR is turned off. Consequently, at the completion of a stepping operation during automatic operation, the circuit 98 is automatically completed to effect a read signal and to turn off the relay 40CCR. When the command registered in the readout register 11 is completed, then the completion signal will flip the flip-flop 90 to again turn on the relay CCR to effect a stepping of the stepping system to select the next command.

It will be appreciated that the command selector can also be operated to select a circuit which is to be set in accordance with input information and associated read-in circuitry provided to effect a setting of the storage.

It can now be seen that the present invention provides a stepping system or mechanism in which stepping relays or devices representative of different digits of a number can be operated to advance the stepping mechanism a count of 1 in response to the energization of the circuit element of the system, or the stepping devices representing the digits of different significances can be made to step concurrently to a certain position to select a number which differs from the immediate number registered by the stepping mechanism by a count of more than 1; and, further, the system can be set so that it can be made to return home from any possible position thereof in response to a predetermined signal. In every case when the number to which the stepping system is being stepped requires a change in the digit of each of the stepping devices, the stepping devices operate concurrently and independently of each other to provide a fast selecting operation.

While the preferred embodiment of the present invention has been described in considerable detail, it is hereby my intention to cover all constructions, modifications and arrangements which fall within the ability of those skilled in the art and within the scope and spirit of the present invention.

What I claim is:

1. In a selecting system of the stepping type, a stepping device having a plurality of positions and operable to step through said positions in a predetermined sequence, control means for said stepping device including a control element energizable to effect repeated stepping of said device until said control element is de-energized, first circuit means for selectively energizing said control element including means responsive to the stepping of said device to a predetermined one of said positions for de-energizing said control element, second circuit means selectively energizable to effect energization of said control element and incuding means responsive to the operation of said device upon each energization of said control element to render said second circuit means ineffective to energize said control element and thereby limit the operation of said device to one step in response to each energization of said second circuit means, and means for selectively effecting operation of said stepping device under the control of a selected one of said first and second circuit means, said first circuit means including means for selecting said predetermined position.

2. In a selecting system of the stepping type, a stepping device having a plurality of positions and operable to step through said positions in a predetermined sequence, control means for said stepping device including a control element energizable to effect repeated stepping of said device while said control element is energized, first circuit means for selectively energizing said control element including means responsive to the stepping of said device to a predetermined one of said positions for de-energizing said control element, second circuit means selectively energizable to effect energization of said control element and including means responsive to the operation of said device upon energization of said control element to render said second circuit means ineffective to energize said control element and thereby limit the operation of said device to one step in response to each energization of said second circuit means, said first circuit means including first and second parallel circuits for energizing said control element, said first parallel circuit including contacts operated by said device when in a home position to break said first parallel circuit and means for selectively rendering said first parallel circuit ineffective and effective, and said second parallel circuit including contacts operated by said stepping device and switch means in circuit with said contacts and making a circuit with said contacts for all positions of said stepping device but one, said switch means being operable to select said one position of said device, said second parallel circuit further including means for selectively rendering said second parallel circuit means effective and ineffective to energize said control element.

3. In a circuit selecting mechanism, a stepping device having a plurality of positions and adapted to be stepped through said positions in a predetermined sequence, said stepping device including an electromagnetic operating element operable to step said device upon the energization and de-energization of the element, first circuit means for selectively energizing said element including first contacts operable between open and closed positions for rendering said first circuit means ineffective and effective and second contacts conditioning said first circuit means to be effective when said electromagnetic element is de-energized and operated in response to the energization of said element to render said first circuit means ineffective, a relay for actuating said first contacts and energizable to actuate said first contacts to their said position rendering said first circuit means effective, second circuit means for selectively maintaining said relay energized including means responsive to the device obtaining a predetermined one of said positions to render said second circuit means ineffective, third circuit means selectively energizable to effect the energization of said relay including selector contact means for selectively rendering said third circuit means effective and third contacts operable to render said third circuit means ineffective and overriding said selector contact means, and means responsive to the energization of said relay for operating said third contacts, and means operable with said selector contact means for maintaining said first circuit means through said first contacts independently of the operation of said second contacts.

4. In a circuit selecting system as defined in claim 3 wherein a second selector contact means is connected in series with said second and third circuit means for selectively rendering said second and third circuit means effective and ineffective, and wherein additional circuit means effects the mutually exclusive operation of said second and third circuit means, and said system includes means for actuating said additional circuit means in response to said stepping device reaching a preselected position for rendering said second circuit means effective.

5. In a circuit selecting system including a stepping device having a plurality of different positions and adapted to be stepped through said positions in a predetermined sequence, said stepping device comprising an electromagnetic element for effecting a single step of said device for each energization and de-energization of said element, said device stepping on the de-energization of said element, first circuit means for energizing said element comprising first contact means and second contact means, said first circuit means being energizable when said contact means are made, a relay energizable to make said first contact means, said second contact means being normally made, means operated in response to the energization of said element for breaking said second contact means to effect de-energization of said first circuit means, second circuit means for selectively energizing said relay including normally closed contacts actuated to an open position in response to said device stepping to a predetermined position and selector contacts for rendering said second circuit means effective, third circuit means for energizing said relay comprising first and second normally open contacts actuatable to render said third circuit means effective and normally closed contacts actuatable to render said third circuit means ineffective to energize said relay, means for selectively actuating said first normally open contacts, control means actuatable to a first condition to make said second normally open contacts to make a shunt circuit in parallel with said second circuit means when said second normally open contact is made and to open said selector contacts and actuatable to a second condition to close said selector contacts and open said second normally open contacts and said shunt circuit.

6. In a circuit selector system, a stepping device having a plurality of positions and adapted to be stepped through said positions in a predetermined sequence, said stepping device including an electromagnetic element for stepping said device a single step in response to the sequential energization and de-energization thereof, first circuit means for energizing said element including first contact means makable for effecting energization of said element and second contact means operated to open and close positions in response to the energization and de-energization of said element, second circuit means for selectively energizing said element through said first contact means independently of said second contact means, third circuit means energizable and de-energizable to effect the making and breaking of said first contact means, and control means for selectively energizing and de-energizing said third circuit means and for selectively rendering a selected one of said second contact means and said second circuit means effective and the other ineffective.

7. A stepping system as defined in claim 6 wherein said third circuit means comprises a relay for actuating said first contact means and first and second parallel circuits for energizing said relay, said control means including means conditioning said first and second parallel circuits to be effective when said second contact means and said second circuit means are effective and means for effecting the mutual exclusive operation of said first and second parallel circuit means, said first parallel circuit including means for rendering said first parallel circuit means ineffective when said relay is in a predetermined position and said second parallel circuit including contacts actuated in response to the energization of said element to de-energize said second parallel circuit.

8. In a selecting system, a pair of first and second stepping devices each having a plurality of positions corresponding in number to the possible values of a digit of a number system, said first stepping device representing one digit of a number and said second stepping device representing a digit of next higher significance with the successive positions of said devices representing the successive magnitudes of the digits and said stepping devices returning to the zero digit value position after the position representing the maximum digit value, first circuit means for effecting a single step of said first stepping device, second circuit means interconnecting said stepping devices to step said second stepping device to each of its successive digit positions only in response to the stepping of said first stepping device from its maximum digit value position to its zero digit value position for each digit position of said second stepping device, and circuit means for selectively stepping said devices to preselected positions for each device independently and concurrently with the operation of the other device.

9. In a circuit selecting system, a pair of first and second stepping devices each having a plurality of positions corresponding in number to the possible values of a digit of a number system, said first stepping device representing one digit of a number and said second stepping device representing a digit of next higher significance with the successive positions of said devices representing the successive magnitudes of the digits, and said stepping devices returning to the zero digit value position after the position representing the maximum digit value, first circuit means for effecting a single step of said first stepping device, second circuit means interconnecting said stepping device to step said second stepping devices in response to the stepping of said first stepping device from its maximum digit value position to its zero digit value position to step said second device to its successive digit positions, said circuit means effecting the stepping of said second stepping device only in response to the stepping of said first device from its maximum digit position to its zero digit position, circuit means for selectively stepping said devices to preselectable postions for each device independently and concurrently with the operation of the other device, and circuit means for concurrently stepping each of said devices independently of the other device to a predetermined position in response to said devices being stepped to positions corresponding to a predetermined number.

10. In a selecting system, a pair of first and second stepping devices each having a plurality of positions corresponding in number to the digit values of a number system, said first stepping device representing one digit of a number of said system and said second stepping device representing the digit of next higher significance with the successive positions of said devices representing the successive magnitudes of the digits of the system and said stepping devices being steppable in sequence through the positions and returning to the position representing the zero digit value from the position representing the maximum digit value, control means for each of said devices including an actuating element energizable and de-energizable to effect a stepping of the corresponding stepping device, first circuit means for effecting a stepping of said first device including a first circuit element energizable to effect a single energization and de-energization of said actuating element for said first stepping device for each energization of said first circuit element, circuit means interconnecting said first device and said second device to energize and de-energize said actuating element for said second device in response to the movement of said first device to its maximum digit position and from its maximum digit position to its zero digit position, additional circuit means for each device including a second circuit element actuable to a first condition to effect repeated energization and de-energization of the corresponding actuating element and including means for rendering the second circuit means ineffective when the corresponding device is in a predetermined position.

11. In a selecting system, a pair of first and second stepping devices each having a plurality of positions corresponding in number to the digit values of a number system, said first stepping device representing one digit of a number of said system and said second stepping device representing the digit of next higher significance with the succesisve positions of said devices representing the successive magnitudes of the digits of the system and said stepping devices being steppable in sequence through the positions and returning to the position representing the zero digit value from the position representing the maximum digit value, control means for each of said devices including an actuating element energizable and de-energizable to effect a stepping of the corresponding stepping device, first circuit means for effecting a stepping of said first device including a first circuit element energizable to effect a single energization and de-energization of said actuating element for said first stepping device for each energization of said first circuit element, circuit means interconnecting said first device and said second device to energize and de-energize said actuating element for said second device in response to the movement of said first device to its maximum digit position and from its maximum digit position to its zero digit position, additional circuit means for each device including a second circuit element actuable to a first condition to effect repeated energization and de-energization of the corresponding actuating element and including means for rendering the second circuit means ineffective when the corresponding device is in a predetermined position, and means responsive to said stepping devices having predetermined positions for actuating said second circuit element to its said first condition.

12. In a circuit selecting system, a pair of first and second stepping devices each having a plurality of positions corresponding in number to the possible digit values of a numbering system, said first stepping device representing one digit of a number of said system and said second stepping device representing the digit of next higher significance with the successive positions of said devices representing the successive magnitudes of the digits and said stepping devices returning to their position corresponding to zero magnitude after the position representing the maximum digit magnitude, a control element, first circuit means selectively responsive to the actuation of said control element to effect a stepping of said first stepping device and a stepping of said second stepping device one step when said first stepping device changes from its maximum to its minimum digit position, second circuit means selectively responsive to the actuation of said control element to effect a repeated stepping of said stepping devices to predetermined positions, control means having a first condition rendering said first circuit means responsive to said control element and a second condition rendering said second circuit means responsive to said control element and means responsive to predetermined positions of said devices to actuate said control means to its said second condition.

13. In a machine control system, a storage for a plurality of commands, a read-out register for said storage, means for selecting and reading out a particular command comprising a stepping mechanism for selecting said particular command and a read signal generator for applying a read signal to said storage through said mechanism to read out a command, said stepping mechanism including a first circuit element energizable to effect a stepping of said mechanism, and first circuit means selectively responsive to the energization of said first circuit element to effect a single stepping of said mechanism to add a count of 1 and de-energized upon a single stepping second circuit means responsive to the energization of said first circuit element to effect a stepping of said mechanism to a predetermined position and de-energized upon said mechanism stepping to said predetermined position and including a second element energizable to render said second circuit means effective and de-energizable to render said second circuit means ineffective, circuit means responsive to a signal for effecting energization of said first element and to the de-energization of said first and second circuit means upon the stepping of said mechanism, to effect a de-energization of said first element, and means responsive to a bit in said read-out register for energizing said second element.

14. A selecting system comprising a stepping mechanism for making a selection, said stepping mechanism including a first circuit element energizable to effect a stepping of said mechanism, and first circuit means selectively responsive to the energization of said first circuit element to effect a single stepping of said mechanism to add a count of 1 and de-energized upon a single stepping, second circuit means responsive to the energization of said first circuit element to effect a stepping of said mechanism to a predetermined position and de-energized upon the stepping of said mechanism to said predetermined position and including a second element energizable to render said second circuit means effective and de-energizable to render said second circuit means ineffective, circuit means responsive to a signal for effecting energization of said first element and to the de-energization of said first and second circuit means upon the stepping of said mechanism to effect a de-energization of said first element, and means for selectively energizing said second element.

15. In an electrical selecting system, a pair of first and second stepping devices each having a plurality of positions corresponding in number to the possible values of a digit of different orders in a number system, a control element actuatable to effect a stepping of the first stepping device, circuit means interconnecting said first and second stepping devices in a counting arrangement to add a count of one to the second stepping device only when said first stepping device steps from its maximum position to its zero position, circuit means selectively responsive to the actuation of the control element for effecting the addition of a count of one in the counting arrangement, and second circuit means selectively responsive to the actuation of said control element when a predetermined count is registered in said stepping devices to cause said stepping devices to step concurrently and independently of each other to predetermined positions for each device.

References Cited by the Examiner

UNITED STATES PATENTS

| | | | |
|---|---|---|---|
| 2,226,692 | 12/40 | Brunner | 340—147 |
| 2,374,537 | 4/45 | Goldsmith. | |
| 2,563,127 | 8/51 | McGoffin | 340—164 |
| 2,583,014 | 1/52 | Pouliart. | |
| 2,875,390 | 2/59 | Tripp | 340—147 XR |
| 2,989,730 | 6/61 | Brosh | 340—164 |
| 3,013,166 | 12/61 | Dunlap. | |

NEIL C. READ, *Primary Examiner.*

UNITED STATES PATENT OFFICE

CERTIFICATE OF CORRECTION

Patent No. 3,200,377 August 10, 1965

William J. Frank, Jr.

It is hereby certified that error appears in the above numbered patent requiring correction and that the said Letters Patent should read as corrected below.

Column 13, line 17, for "close" read -- closed --; line 59, for "preselected" read -- preselectable --; line 73, for "device" read -- devices --; same column 13, line 74, for "devices" read -- device --.

Signed and sealed this 26th day of April 1966.

(SEAL)
Attest:

ERNEST W. SWIDER
Attesting Officer

EDWARD J. BRENNER
Commissioner of Patents